United States Patent
Li

(10) Patent No.: US 10,766,108 B2
(45) Date of Patent: Sep. 8, 2020

(54) AUTOMATIC FAULT DIAGNOSABLE INTEGRATED SHEET BODY PUNCHING AND GRINDING ASSEMBLY

(71) Applicant: DONGGUAN UNIVERSITY OF TECHNOLOGY, Dongguan (CN)

(72) Inventor: Chuan Li, Dongguan (CN)

(73) Assignee: DONGGUAN UNIVERSITY OF TECHNOLOGY, Dongguan (CN)

( * ) Notice: Subject to any disclaimer, the term of this patent is extended or adjusted under 35 U.S.C. 154(b) by 0 days.

(21) Appl. No.: 16/417,547

(22) Filed: May 20, 2019

(65) Prior Publication Data
US 2019/0389024 A1     Dec. 26, 2019

(30) Foreign Application Priority Data

Jun. 25, 2018 (CN) .......................... 2018 1 0659416

(51) Int. Cl.
*B23P 23/02* (2006.01)
*B24B 51/00* (2006.01)
(Continued)

(52) U.S. Cl.
CPC .............. *B23P 23/02* (2013.01); *B21D 28/04* (2013.01); *B23P 23/04* (2013.01); *B23Q 15/225* (2013.01);
(Continued)

(58) Field of Classification Search
CPC .. B26F 1/02; B23P 23/02; B23P 23/04; B21D 28/04; G01N 21/89; Y10T 29/5105;
(Continued)

(56) References Cited

U.S. PATENT DOCUMENTS 2,062,044 A * 11/1936 Stoffel ................. B44B 5/0052
72/333
3,580,120 A * 5/1971 Adams ................. B26D 7/1854
83/98
(Continued)

FOREIGN PATENT DOCUMENTS

EP        0781635 B1 * 10/2001 ................ B26F 1/02
FR        2514271 A1 *  4/1983 ............. B21D 28/26
(Continued)

*Primary Examiner* — Sunil K Singh
*Assistant Examiner* — Michael Vitale
(74) *Attorney, Agent, or Firm* — Law Offices of Steven W. Weinrieb

(57) ABSTRACT

The present invention relates to an automatic fault diagnosable integrated sheet body punching and grinding assembly, including a frame and a conveying slot seat, a processing frame is provided on the conveying slot seat, the processing frame is sequentially provided with a punching device and a grinding device; the frame is provided with a feeding motor and a feeding screw cooperating with each other, the feeding screw is sleeved with a movable feeding block, and the movable feeding block is fixedly connected with a movable feeding seat, the movable feeding seat is provided with a feeding lift cylinder, the feeding lift cylinder is provided with a feeding lift block; the feeding lift block is evenly disposed with feeding blocks that can pass through the feeding slot, and the distance between the processing portion of the punching device and the grinding device is the same as that between the adjacent two feeding blocks. In the present invention, the conveying slot seat cooperates with the fixed distance feeding part to realize the fixed distance feeding of the sheet bodies, the punching device and the grinding device are provided sequentially on the conveying slot seat, which enables continuous automatic punching and grinding of sheet bodies, thereby greatly improves the efficiency of punching and grinding of the sheet bodies.

8 Claims, 6 Drawing Sheets

(51) Int. Cl.
*B26F 1/02* (2006.01)
*B21D 28/04* (2006.01)
*B23Q 15/22* (2006.01)
*B23Q 17/22* (2006.01)
*B23Q 17/24* (2006.01)
*B23P 23/04* (2006.01)

(52) U.S. Cl.
CPC ......... *B23Q 17/22* (2013.01); *B23Q 17/2419* (2013.01); *B23Q 17/2471* (2013.01); *B24B 51/00* (2013.01); *B26F 1/02* (2013.01); *Y10T 29/517* (2015.01); *Y10T 29/5136* (2015.01); *Y10T 29/5146* (2015.01); *Y10T 83/6476* (2015.04); *Y10T 83/9418* (2015.04)

(58) Field of Classification Search
CPC ............. Y10T 29/5107; Y10T 29/5136; Y10T 29/5146; Y10T 29/5168; Y10T 29/517; Y10T 29/5171; Y10T 29/5172; Y10T 29/5173; Y10T 29/5174; Y10T 29/5175; Y10T 29/5176; Y10T 83/6476; Y10T 83/8484; Y10T 83/7487; Y10T 83/75; Y10T 83/9418; Y10T 83/9423; Y10T 83/9425; Y10T 83/9428

USPC ... 29/26 A, 26 R, 50, 51, 52, 53, 54, 55, 56, 29/56.5, 564, 565; 83/404, 405, 452, 83/454, 682, 684, 686; 451/65, 461
See application file for complete search history.

(56) References Cited

U.S. PATENT DOCUMENTS

| | | | | |
|---|---|---|---|---|
| 3,673,901 | A | * | 7/1972 | Vinson ................... B21D 28/04 83/14 |
| 5,259,100 | A | * | 11/1993 | Takahashi .............. B21D 28/12 29/33 J |
| 2015/0027999 | A1 | * | 1/2015 | Yamaguchi ............ B23K 37/08 219/121.44 |

FOREIGN PATENT DOCUMENTS

| | | | | |
|---|---|---|---|---|
| JP | 59094535 | A | * 5/1984 | ............. B21D 28/04 |
| JP | 06015381 | A | * 1/1994 | |
| JP | 2003071661 | A | * 3/2003 | ............. B21D 28/26 |
| WO | WO-2010140960 | A1 | * 12/2010 | ................ B26F 1/02 |

* cited by examiner

AUTOMATIC FAULT DIAGNOSABLE INTEGRATED SHEET BODY PUNCHING AND GRINDING ASSEMBLY

FIELD OF THE INVENTION

The present invention relates to the field of integrity detection of the processing equipment, and more specifically to an automatic fault diagnosable integrated sheet body punching and grinding assembly.

BACKGROUND OF THE INVENTION

As a commonly used processing material, the sheet body is widely used, especially in the use of gaskets and connecting sheets. In order to achieve a better matching installation structure, gaskets are sometimes punched.

Most sheet bodies need to be grinded after being punched to grind the punched holes smoothly. Existing devices usually separate the process of punching and grinding, in this case, two devices are required for processing. Moreover, as it is necessary to reclaim, position and locate material for each device, production efficiency is low, and continuous processing cannot be achieved.

OVERALL OBJECTIVE OF THE INVENTION

The overall objective of the present invention is to provide a automatic fault diagnosable integrated sheet body punching and grinding assembly, the conveying slot seat is fitted with the fixed distance feeding part to realize the fixed distance feeding of the sheet body, the punching device and the grinding device are disposed in sequence with the top of the conveying slot seat, which enables continuous automatic punching and grinding of the sheet body, thereby greatly improving the efficiency of punching and grinding of the sheet body.

SUMMARY OF THE INVENTION

In order to achieve the above objective, the technical solution adopted by the present invention are: an automatic fault diagnosable integrated sheet body punching and grinding assembly, including a frame and a conveying trough seat disposed on the frame; a feed trough is disposed in the middle portion of the conveying trough seat, and a processing frame is disposed on the conveying trough seat; the processing frame is sequentially provided with a punching device and a grinding device matching with the sheet body in the conveying trough seat, the frame is disposed with a feed motor and a feed screw cooperating with each other, the feed screw is sleeved with movable feed blocks, the movable feed block is connected with a movable feed seat, the movable feed seat is provided with a feed lift cylinder, the feed lift cylinder is disposed with a feed lift block; several feed blocks which can penetrate the feed trough are uniformly provided on the feed lift block, and the distance between processing portions of the punching device and the grinding device is the same as that between the adjacent two feeding blocks. Preferably, the feed block is an L-shaped block, and the length of horizontal portion thereof is consistent with the length of the sheet body. The feed blocks located at the punching station and the grinding station are provided with a discharging opening matching with the punching and grinding portion of the sheet body. The feed lift block is provided with a collect port which is connected with the discharging opening; on the movable feeding seat is provided a collection assembly cooperating with the collect port.

Preferably, a processing lift cylinder is provided below the processing frame, and a processing lift seat is connected below the processing lift cylinder, the length of the processing lift seat is consistent with the distance between the adjacent two feeding blocks; a fitting opening is provided directly above the vertical portion of the feed block, the punching device and the grinding device are all disposed below the processing lift seat; the grinding device includes a grinding motor disposed under the processing lift seat, and a grinding head is disposed under the grinding motor; the part of the processing lift seat corresponding to both sides of the grinding motor is connected to a grinding press block corresponding with the product on the feed block through processing buffer springs, the grinding head cooperates with the grinding press block by plugging and fitting.

Preferably, the lower portion of the grinding head is tapered, the beam receiver is embedded in the middle of the bottom surface of the grinding head, a beam emitter is disposed within the feeding lift block, the beam emitter mounting plate of the beam emitter is fixed in the feed lift block by bolts, the upper portion of the beam emitter is flush with the lower portion of the collection port connected to the discharging opening of the grinding station. And the beam emitter can emit a vertical beam that coincides with the axis of the discharging opening.

Preferably, the lower portion of the grinding press block is embedded with a first contact sensor, the processing lift seat is provided with an inverted slot shaped feeding height detection block at the portion of the fitting opening, two acoustic wave range finders cooperating with the upper surface of vertical part of the feeding block are provided under the feeding height detection slot.

Preferably, the punching device includes a punching head disposed under the processing lift seat, the part of processing lift seat to the outside the punching head is connected with a punching press block cooperating with the product on the feeding block by processing buffer springs, the punching press block cooperates with the punching head by plugging and fitting, and a second contact sensor is embedded in the lower portion of the punching block.

Preferably, the lower portion of the processing lift seat is provided with a punching rotary motor, the punching head is provided under the punching rotary motor, and the lower portion of the punching head is an rotary cutter, and the upper end thereof is a baffle block larger than the punching diameter.

Preferably, the collect device includes collect assembly motors disposed on the feed lift seat, and the collect assembly motors are provided on both sides of the collect port, and upper portion of the collecting assembly motors are connected with a vertically oriented collecting assembly rotary shafts. The outside of the collecting assembly rotary shafts are sleeved with a collect assembly rotating sleeves, the collect assembly rotating sleeves are disposed inside the rotating sleeve bearing housings, which are provided below the feed lift block. The outer side of the collecting assembly rotary shafts are provided with a vertical oriented rotating shaft mating sockets. The collect assembly rotating sleeves are provided with a rotating shaft mating plugs matching the rotating shaft mating socket, the lower portion of the collect assembly rotating sleeves are fixedly sleeved with collect support rotating blocks, and collect box is disposed on the two support collection blocks.

REFERENCE NUMBER KEY

The drawings includes following integers denoting the various components:
1—frame;
2—Conveying slot seat;
3—Feeding slot;
4—Sheet body;
5—Feeding motor;
6—Feeding screw;
7—Movable feeding block;
8—Movable feeding seat;
9—Feeding lift cylinder;
10—Feeding lift block;
11—Feeding block;
12—Processing frame;
13—Punching device;
14—Grinding device;
15—Collecting device;
21—Processing Lift cylinder;
22—Processing lift seat;
23—Grinding motor;
24—Grinding head;
25—Beam receiver;
26—Discharging opening;
27—Collecting port;
28—Beam emitter mounting plate;
29—Beam emitter;
30—Processing buffer spring;
31—Grinding press block;
32—First contact sensor;
33—Feeding height detection slot;
34—Acoustic wave range finder;
36—Punching rotary motor;
37—Punching head;
38—Second contact sensor;
39—Punching press block;
42—Collecting assembly motor;
43—Collecting assembly shaft;
44—Sleeve mounting bearing seat;
45—Collecting assembly rotary sleeve;
46—Collecting support rotary block;
47—Collecting frame;
48—Rotary shaft fitting socket;
49—Rotating shaft mating plug.

DETAILED DESCRIPTION OF THE ILLUSTRATED EMBODIMENT

The present invention will be described in detail below with reference to the accompanying drawings, and the description of the present invention is only exemplary and explanatory, and should not be construed as limiting the scope of the present invention.

Figure 1:
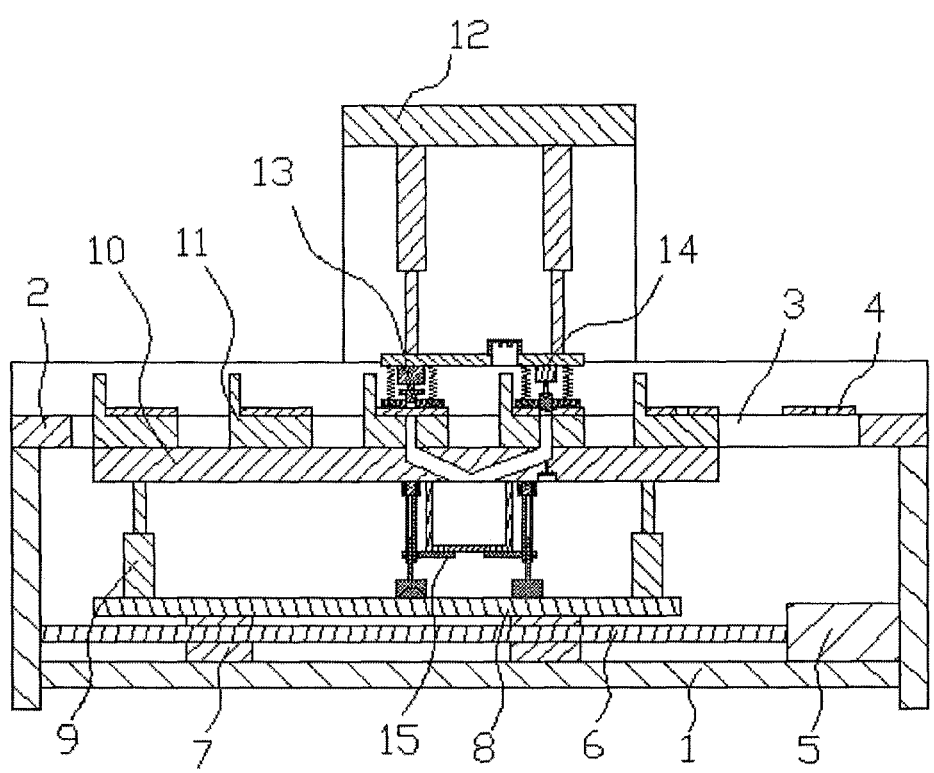
FIG. 1 is a schematic structural view of the automatic fault diagnosable integrated sheet body punching and grinding assembly.

As shown in FIG. 1, the specific structure of the present invention comprises an automatic fault diagnosable integrated sheet body punching and grinding assembly, including a frame 1 and a conveying slot seat 2 provided on the frame 1, wherein the middle of the conveying slot seat 2 is provided with a feeding slot 3, a processing frame 12 is provided on the conveying slot seat 2, the processing frame 12 is sequentially provided with a punching device 13 and a grinding device 14 fitted with a sheet body 4 in the conveying slot seat 2; the frame 1 is provided with a feeding motor 5 and a feeding screw 6 fitting with each other, the feeding screw 6 is sleeved with a movable feeding block 7, and the movable feeding block 7 is fixedly connected with a movable feeding seat 8, the movable feeding seat 8 is provided with a feeding lift cylinder 9, the feeding lift cylinder 9 is provided with a feeding lift block 10; the feeding lift block 10 is evenly disposed with feeding blocks 11 that can pass through the feeding slot 3, and the distance between the punching device 13 and the processing portion of the grinding device 14 is the same as the distance between the adjacent two feeding blocks 11.

The reciprocating feeding of the feed motor 5 is used to matching the reciprocating lifting of the lift cylinder, which may realize the reciprocating feeding and lifting of the feeding block. Further, the sheet body on the feeding trough can be fed for a fixed distance, and sequentially passes through the punching device and the grinding device. The integrated punching and grinding of the sheet body greatly improves the overall processing efficiency of the sheet body.

Figure 2:
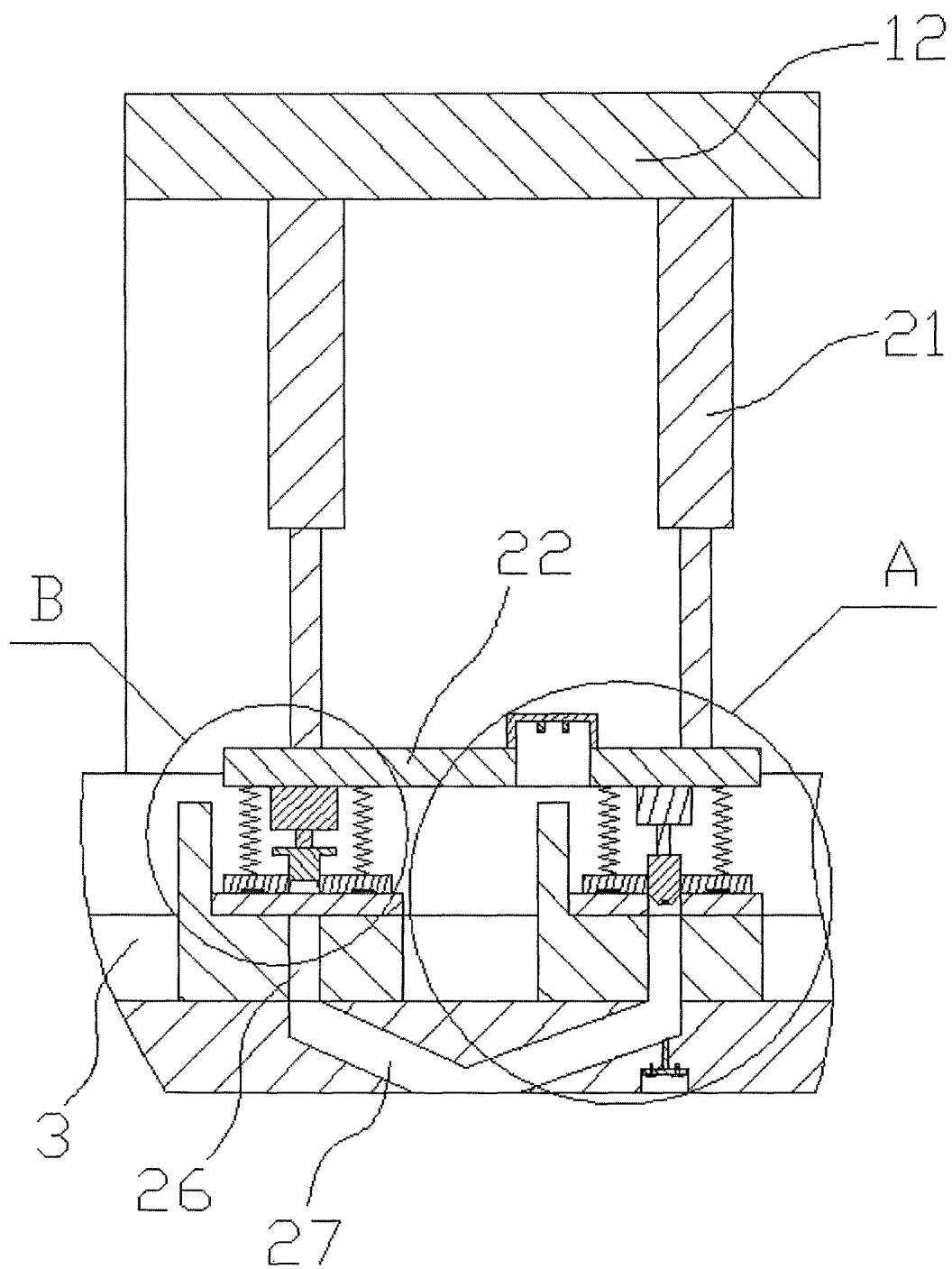
FIG. 2 is a schematic structural view of the grinding device and the punching device.

As shown in FIGS. 1 and 2, the feed block 11 is an L-shaped block, and the length of horizontal portion thereof is consistent with the length of the sheet body. The feed blocks 11 located at the punching station and the grinding station are provided with a discharging opening 26 matching with the punching and grinding portion of the sheet body. The feed lift block 10 is provided with a collect port 27 which is connected with the discharging opening 26; on the movable feeding seat 8 is provided a collection assembly 15 cooperating with the collect port 27.

By developing the structure of the feed blocks, the feed block can support the sheet body, and the punching and grinding effect of the sheet body can be improved, and a discharging opening is disposed to match the collect device, and the punching and grinding reject can be collected, thereby avoids interference with the feed portion.

Figure 3:
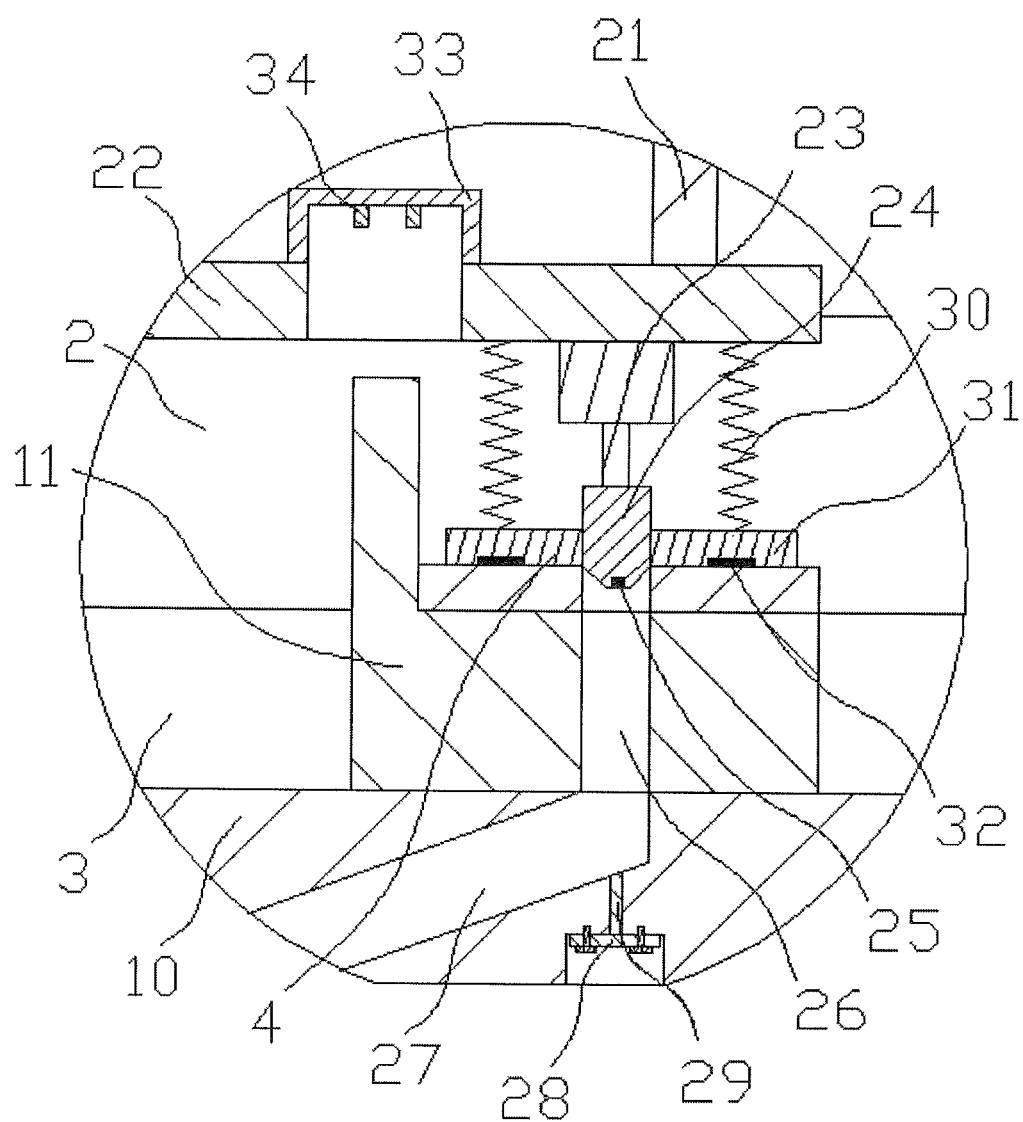
FIG. 3 is a partial enlarged view of part A in FIG. 2.

As shown in FIGS. 2 and 3, a processing lift cylinder 21 is provided below the processing frame 12, and a processing lift seat 22 is connected below the processing lift cylinder 21, the length of the processing lift seat 22 is consistent with the distance between the adjacent two feeding blocks 11; a fitting opening is provided directly above the vertical portion of the feed block 11, the punching device 13 and the grinding device 14 are all disposed below the processing lift seat 22; the grinding device 14 includes a grinding motor 23 disposed under the processing lift seat 22, and a grinding head 24 is disposed under the grinding motor 23; the part of the processing lift seat 22 corresponding to both sides of the grinding motor 23 is connected to a grinding press block 31 corresponding with the product on the feed block 11 through processing buffer springs 30, the grinding head 24 cooperates with the grinding press block 31 by plugging and fitting.

Both the punching device and the grinding device are provided on the processing lift seat, so that the synchronous grinding can be achieved, and forces are in a balance.

Meanwhile, it is also possible to detect the feeding precision from the processing conditions of the two processing parts. By providing a compactable material pressing plate cooperating with the grinding head by plugging and fitting, during descending of the grinding head, interference with the material pressing part will not occur, which achieves good material holding effect for grinding.

As shown in FIG. 3, the lower portion of the grinding head 24 is tapered, the beam receiver 25 is embedded in the middle of the bottom surface of the grinding head 24, a beam emitter 29 is disposed within the feeding lift block 10, the beam emitter mounting plate 28 of the beam emitter 29 is fixed in the feed lift block 10 by bolts, the upper portion of the beam emitter 29 is flush with the lower portion of the collection port 27 connected to the discharging opening 26 of the grinding station. And the beam emitter 29 can emit a vertical beam that coincides with the axis of the discharging opening 36.

The beam emitter is used to emit a vertical beam passing through the discharging opening, and the receiving condition of the beam receiver can be used to determine whether the feeding is accurate. If the beam receiver receives the beam from the beam emitter, the feeding is accurate, and the sheet body is fed to the accurate grinding station. Otherwise, there is an error in feeding distance and the device needs to be shut down for maintenance.

As shown in FIGS. 2 and 3, the lower portion of the grinding press block 31 is embedded with a first contact sensor 32, the processing lift seat 22 is provided with an inverted slot shaped feeding height detection block 33 at the portion of the fitting opening, two acoustic wave range finders 34 cooperating with the upper surface of vertical part of the feeding block 11 are provided under the feeding height detection slot 33.

By developing of the first contact sensor the measurement position of the acoustic range finders can be determined, the measurement of the acoustic range finders can detect the height of the vertical part of the feeding block, thus ensure the precise lifting of the feeding block. The processing lift cylinder stops lifting when the first contact sensor generates an inductive signal. If the values measured by the two acoustic range finders are consistent with the theoretical values, the feeding height is accurate, and as long as one measured values are different from the theoretical values, there is a problem with accuracy of the feeding height. Together with signal of the beam receiver, it can be judged whether the feeding distance is not accurate or the lifting accuracy is not accurate.

Figure 4:
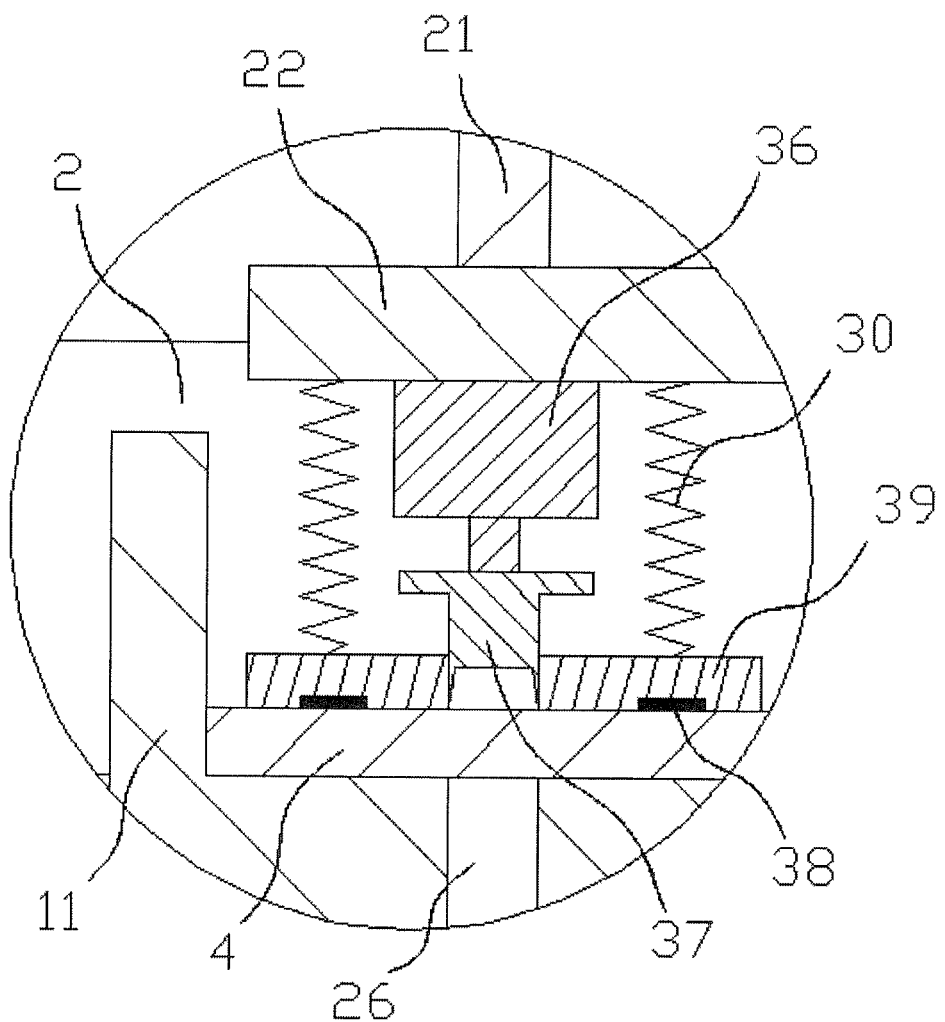
FIG. 4 is a partial enlarged view of part B in FIG. 2.

As shown in FIG. 4, the punching device 13 includes a punching head 37 disposed under the processing lift seat 22, the part of processing lift seat 22 to the outside the punching head 37 is connected with a punching press block 39 cooperating with the product on the feeding block 11 by processing buffer springs 30, the punching press block 39 cooperates with the punching head 37 by plugging and fitting, and a second contact sensor 38 is embedded in the lower portion of the punching block 39.

The structure of the second contact sensor can cooperate with the first contact sensor to reflect whether the thickness of the sheet is consistent, if the first contact sensor and the second contact sensor simultaneously generate sensing signals, the thickness of the products at the punching station and the grinding station is consistent, and the value measured by the acoustic range finder is more accurate. If the first contact sensor and the second contact sensor do not simultaneously generate the sensing signal, the thickness of products at the punching station and the grinding station is inconsistent.

The lower portion of the processing lift seat 22 is provided with a punching rotary motor 36, the punching head 37 is provided under the punching rotary motor 36, and the lower portion of the punching head 37 is an rotary cutter, and the upper end thereof is a baffle block larger than the punching diameter. The structural design of the punching head, combined with the design of the punching rotary motor, can achieve a better punching effect, and can also avoid excessive punching, thereby damaging the feeding block.

Figure 5:
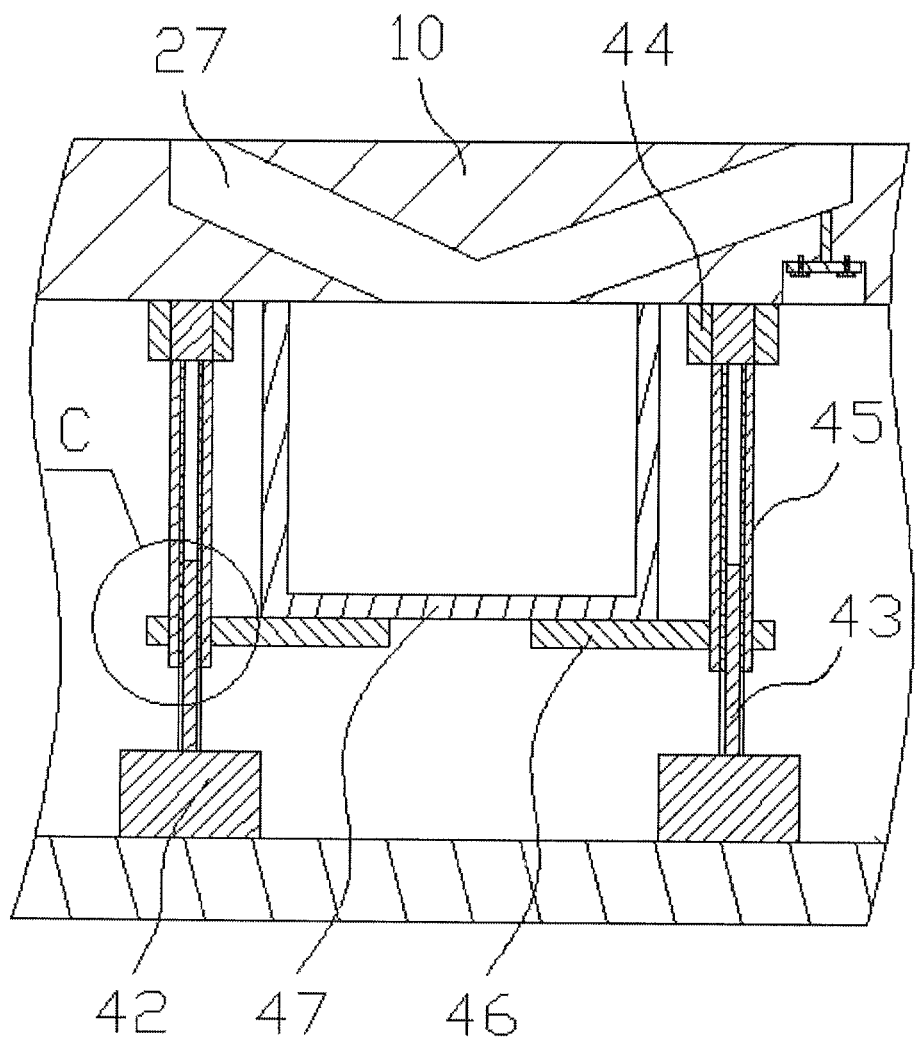
FIG. 5 is a schematic structural view of the collecting device.
Figure 6:
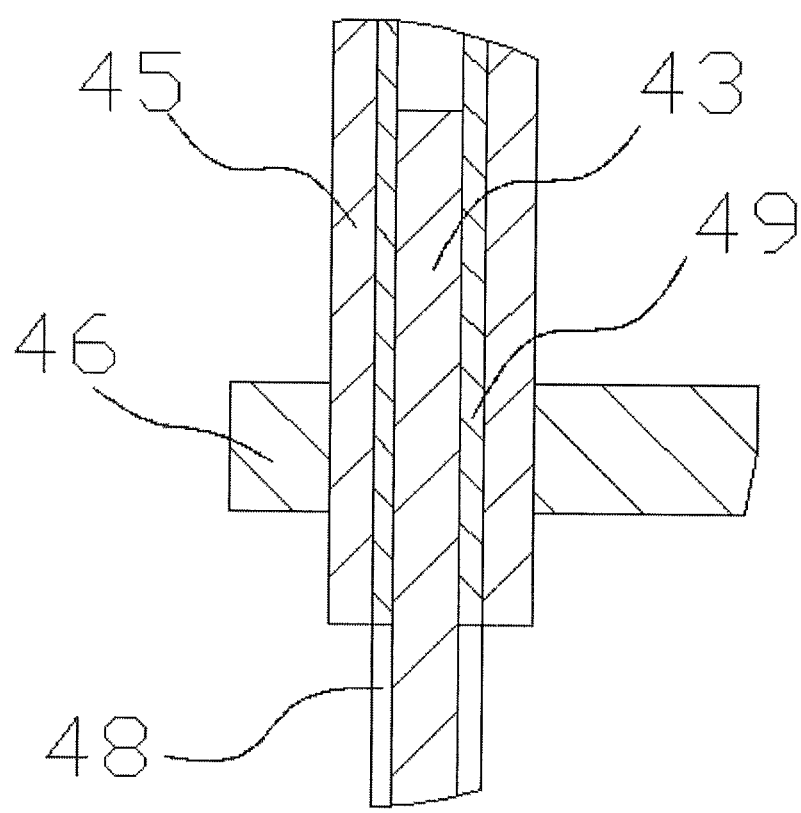
FIG. 6 is a partial enlarged view of part C in FIG. 5.

As shown in FIGS. 5 and 6, the collect device 15 includes 2 collect assembly motors 42 disposed on the feed lift seat 8, and the 2 collect assembly motors 42 are provided on both sides of the collect port 27, and upper portion of the collecting assembly motors 42 are connected with a vertically oriented collecting assembly rotary shafts 43. The outside of the collecting assembly rotary shafts 43 are sleeved with a collect assembly rotating sleeves 45, the collect assembly rotating sleeves 45 are disposed inside the rotating sleeve bearing housings 44, which are provided below the feed lift block 10. The outer side of the collecting assembly rotary shafts 43 are provided with a vertical oriented rotating shaft mating sockets 48. The collect assembly rotating sleeves 45 are provided with a rotating shaft mating plugs 49 matching the rotating shaft mating socket 48, the lower portion of the collect assembly rotating sleeves 45 are fixedly sleeved with collect support rotating blocks 46, and collect box 47 is disposed on the two support collection blocks 46.

The collect device realizes the rotation of the support rotating block through the rotation of the collect assembly motor, thereby the support and discharge of the collect frame can be realized, which may play a good role in collecting and discharging rejects. Meanwhile, it can also guide the lifting of the feed lift block, and when feeding at left and right orientation, the movable feed seat and the feed lift block can be operated synchronously.

The overall operation is as follows:

Debug the device first, then put the iron sheet into the left part of the feeding slot 3 on the feeding slot seat 2; rotate the feeding screw 6 by the feeding motor 5, thereby drive the movable feeding seat 8 to move to the left, thereby the feeding block 11 is moved to the left of the sheet body 5; the feeding lift cylinder 9 drives the feeding lift block 10 to move up, thereby the feed block 11 is raised and vertical portion thereof passing through the feeding slot 3; the feed motor 5 is rotated reversely to drive the feed screw 6 to rotate reversely, thereby drive the feeding block 11 to move to the right; during that, the sheet body 4 is touched and is driven to move to the right by a certain distance to complete a fixed distance movement. Subsequently, the sheet body is repeatedly placed and moved for a fixed distance, the first sheet body will be fed to the punching station by the feeding block 11 matching the punching station during the process of feeding for a fixed distance; then the processing lifting cylinder 21 drives the processing lifting seat 22 to descend, and stops when the second contact sensor 38 generates a sensing signal. The acoustic range finder 34 performs measuring, if the values measured by the two acoustic range finders are consistent with the theoretical values, the feeding is accurate, if the values measured by the two acoustic range finder are consistent but not consistent with the theoretical values, there is a problem with the lifting height of the feeding block 11, which requires maintenance. If the two measured values differ greatly, irradiate a beam with the beam emitter 29 and if the beam receiver 25 receives the beam emitted by the beam emitter 29, the position of the acoustic range finders needs adjusting, if the beam receiver 25 does not receive the beam emitted by the beam emitter 29, the feeding of the feeding block is not accurate.

After the above-mentioned integrity detection is performed, the processing lift cylinder 21 drives the processing lift seat 22 to continue to descend, thereby the punching head 37 contacts the product, and the punching rotary motor 36 drives the punching head 37 to rotate and punch, and thereby completes the punching process; thereafter return the processing lift cylinder 21 to its original position, and convey the next sheet body to the punching station by the way of cooperation of left-right reciprocating motion and lifting reciprocating motion of the feeding block; the punched sheet body will be fed to the grinding station, and the feeding distance and lifting height of the feeding block is detected in the same way; in the detection process, there is one more step, that is, whether the first contact sensor and the second contact sensor synchronously generate sensing signal; if the sensing signal is generated synchronously, the thickness of the sheet body is consistent, if the sensing signal is not generated synchronously, the thickness of the sheet body is inconsistent and needs to be reviewed; after that, the processing lift cylinder 21 continues to descend, and the punching device runs just like before. The grinding device 14 drives the grinding head 24 to rotate by the grinding motor 23, and finishes the grinding by fitting with the lifting of the processing lift cylinder 21, then repeats the above process until the sheet body is completely processed.

It is to be understood that the term "includes", "including" or any other variants thereof is intended to encompass a non-exclusive inclusion, such that a process, method, article, or device including a plurality of elements includes not only those elements, but also other elements that are not explicitly listed, or elements that are inherent to such a process, method, item, or device.

The principles and embodiments of the present invention have been described herein with reference to specific examples. The description of the above examples is only to aid in understanding the method of the present invention and its core idea. The above description is only a preferred embodiment of the present invention, and it should be noted that due to the finiteness of the expression of words, there is an infinite concrete structure objectively. It will be apparent to those skilled in the art that a number of modifications, modifications, or variations may be made without departing from the principles of the invention, and the technical features described above may be combined in an appropriate manner; The invention may be applied to other applications directly or in combination without modification, and should be considered as the scope of protection of the present invention.

What is claimed is:

1. An automatic fault diagnosable integrated sheet body punching and grinding assembly, comprising:
    a frame (1) and a conveying trough seat (2) disposed on the frame (1);
    a feed trough (3) disposed in a middle portion of the conveying trough seat (2); and
    a processing frame (12) disposed on the conveying trough seat (2);
    wherein said processing frame (12) is sequentially provided with a punching device (13) comprising a punching head (37) and a grinding device (14) comprising a grinding head (24), said punching device (13) and said grinding device (14) matching with a sheet body (4) for punching and grinding said sheet body (4) which is disposed within said conveying trough seat (2);
    wherein said frame (1) is disposed with a feed motor (5) and a feed screw (6) cooperating with each other, the feed screw (6) is sleeved with movable feed blocks (7), wherein said movable feed blocks (7) are connected with a movable feed seat (8), said movable feed seat (8) is provided with a feed lift cylinder (9), and said feed lift cylinder (9) is disposed with a feed lift block (10);
    wherein a plurality of feed blocks (11), which can travel along said feed trough (3), are uniformly provided upon said feed lift block (10); and
    wherein a distance defined between said punching head (37) of said punching device (13) and said grinding head (24) of said grinding device (14) is the same as that defined between two adjacent feed blocks (11) of said plurality of feed blocks (11).

2. The automatic fault diagnosable integrated sheet body punching and grinding assembly as set forth in claim 1, wherein:
    each feed block (11) of said plurality of feed blocks (11) is an L-shaped block, and the length of a horizontal portion of each feed block (11) is consistent with the length of said sheet body (4);
    two feed blocks (11) of said plurality of feed blocks (11) are located at punching device (13) and said grinding device (14), and each of said two feed blocks (11) is provided with a respective discharging opening (26) matching a punched and ground portion of said sheet body (4);
    said feed lift block (10) is provided with a collection port (27) which is connected with said respective discharging openings (26) of said two feed blocks (11) located at said punching device (13) and said grinding device (14); and
    upon said movable feed seat (8), there is provided a collection assembly (15) cooperating with said collection port (27).

3. The automatic fault diagnosable integrated sheet body punching and grinding assembly as set forth in claim 2, wherein:
    said collection assembly (15) includes two collection assembly motors (42) disposed upon said movable feed seat (8), and said two collection assembly motors (42) are provided upon opposite sides of said collection port (27);
    an upper portion of each one of said two collection assembly motors (42) is respectively connected with a vertically oriented collection assembly rotary shaft (43);
    the outside of each one of said collection assembly rotary shafts (43) is respectively sleeved with a collection assembly rotating sleeve (45);
    each one of said collection assembly rotating sleeves (45) is disposed inside a rotating sleeve bearing housing (44) which is disposed beneath said feed lift block (10);
    the outside of each one of said collection assembly rotary shafts (43) is respectively provided with a vertically oriented rotating shaft mating socket (48);
    each one of said collection assembly rotating sleeves (45) is provided with a rotating shaft mating plug (49) matching the corresponding rotating shaft mating socket (48);
    a lower portion of each one of said collection assembly rotating sleeves (45) is respectively fixedly sleeved with a collection support rotating block (46); and a collection box (47) is disposed upon each one of said collection support rotating blocks (46).

4. The automatic fault diagnosable integrated sheet body punching and grinding assembly as set forth in claim 1, wherein:
- a processing lift cylinder (21) is provided beneath said processing frame (12);
- a processing lift seat (22) is connected beneath said processing lift cylinder (21), wherein the length of said processing lift seat (22) is consistent with the distance between said two adjacent feed blocks (11) of said plurality of feed blocks (11);
- a fitting opening is provided directly above a vertical portion of a first one of said plurality of feed blocks (11) that is disposed at said grinding device (14);
- said punching device (13) and said grinding device (14) are each disposed below said processing lift seat (22);
- said grinding device (14) includes a grinding motor (23) disposed beneath said processing lift seat (22), and said grinding head (24) is disposed beneath said grinding motor (23);
- a part of said processing lift seat (22) corresponding to both sides of said grinding motor (23) is connected to a grinding press block (31) corresponding with said sheet body (4) on said first one of said plurality of feed blocks (11) through processing buffer springs (30); and
- said grinding head (24) cooperates with said grinding press block (31) by plugging and fitting.

5. The automatic fault diagnosable integrated sheet body punching and grinding assembly as set forth in claim 4, wherein:
- a lower portion of said grinding head (24) is tapered;
- a beam receiver (25) is embedded in a bottom surface portion of said grinding head (24);
- a beam emitter (29) is disposed within said feed lift block (10);
- a beam emitter mounting plate (28) of said beam emitter (29) is fixed in said feed lift block (10) by bolts;
- an upper portion of said beam emitter (29) is flush with a lower portion of said collection port (27) which is connected to a discharging opening (26) of said first one of said plurality of feed blocks (11) that is disposed at said grinding device (14); and
- said beam emitter (29) can emit a vertical beam that coincides with said discharging opening (26).

6. The automatic fault diagnosable integrated sheet body punching and grinding assembly as set forth in claim 4, wherein:
- a lower portion of grinding press block (31) is embedded within a first contact sensor (32);
- said processing lift seat (22) is provided with an inverted slot shaped feeding height detection block (33) at said fitting opening; and
- two acoustic wave range finders (34) cooperating with an upper surface portion of said vertical portion of said first one of said plurality of feed blocks (11) are provided beneath said feeding height detection slot (33).

7. The automatic fault diagnosable integrated sheet body punching and grinding assembly as set forth in claim 6, wherein:
- said punching head (37) of said punching device is disposed beneath said processing lift seat (22);
- a part of said processing lift seat (22) to the outside of said punching head (37) is connected with a punching press block (39) which cooperates with said sheet body (4) on a second one of said plurality of feed blocks (11) by processing buffer springs (30);
- said punching press block (39) cooperates with said punching head (37) by plugging and fitting; and
- a second contact sensor (38) is embedded within a lower portion of said punching block (39).

8. The automatic fault diagnosable integrated sheet body punching and grinding assembly as set forth in claim 7, wherein:
- a lower portion of said processing lift seat (22) is provided with a rotary punching motor (36);
- said punching head (37) is provided beneath said rotary punching motor (36); and
- a lower portion of said punching head (37) is a rotary cutter while an upper portion thereof is a block which is larger than the punching diameter of said punching head (37).

\* \* \* \* \*